United States Patent
Stoeffler et al.

(10) Patent No.: US 12,459,121 B2
(45) Date of Patent: Nov. 4, 2025

(54) INTEGRITY AND SAFETY CHECKING FOR ROBOTS

(71) Applicant: Intel Corporation, Santa Clara, CA (US)

(72) Inventors: Norbert Stoeffler, Graefelfing (DE); Kay-Ulrich Scholl, Malsch (DE); Fabian Oboril, Karlsruhe (DE); Yang Peng, Munich (DE)

(73) Assignee: INTEL CORPORATION, Santa Clara, CA (US)

( * ) Notice: Subject to any disclaimer, the term of this patent is extended or adjusted under 35 U.S.C. 154(b) by 810 days.

(21) Appl. No.: 17/553,859

(22) Filed: Dec. 17, 2021

(65) Prior Publication Data

US 2022/0105633 A1    Apr. 7, 2022

(51) Int. Cl.
*B25J 9/16*   (2006.01)
*B25J 19/02*   (2006.01)

(52) U.S. Cl.
CPC ........... *B25J 9/1674* (2013.01); *B25J 9/1664* (2013.01); *B25J 19/02* (2013.01); *G05B 2219/39001* (2013.01); *G05B 2219/50193* (2013.01)

(58) Field of Classification Search
CPC ........ B25J 9/1674; B25J 9/1664; B25J 19/02; B25J 19/06; B25J 5/007; G05B 2219/39001; G05B 2219/50193
See application file for complete search history.

(56) References Cited

U.S. PATENT DOCUMENTS

| | | | |
|---|---|---|---|
| 10,335,962 B1* | 7/2019 | Rosenberg | B25J 9/1674 |
| 2020/0104611 A1* | 4/2020 | Ross | G06V 20/58 |
| 2020/0331146 A1* | 10/2020 | Vu | G06T 19/20 |
| 2024/0199333 A1* | 6/2024 | Zizka | B65G 1/1373 |

OTHER PUBLICATIONS

S. Thoduka, J. Gall and P. G. Plöger, "Using Visual Anomaly Detection for Task Execution Monitoring," 2021 IEEE/RSJ International Conference on Intelligent Robots and Systems (IROS), Prague, Czech Republic, 2021, pp. 4604-4610 (Year: 2021).*

(Continued)

*Primary Examiner* — Adam R Mott
*Assistant Examiner* — Matthew C Gammon
(74) *Attorney, Agent, or Firm* — VIERING, JENTSCHURA & PARTNER mbB

(57) ABSTRACT

Disclosed herein are systems, devices, and methods for efficiently checking the integrity of a robot system. The integrity-checking system may generate a predefined motion instruction for a robot, where the predefined motion instruction instructs the robot to perform a random movement at a test time. The random movement may be associated with an expected observation at the test time. The integrity-checking system may also determine a systematic failure based on a difference between the expected observation and a current observation of the robot at the test time. The current observation may be determined from received sensor data, and if the integrity-checking system detects a failure, it may stop the robot's motion or other mitigating instructions.

22 Claims, 5 Drawing Sheets

(56) References Cited

OTHER PUBLICATIONS

X. Li, W. Chen, W. Zhang, X. Gao and L. Hao, "Acceleration of the Development for Motion Planning Algorithms Using V-REP," 2019 WRC Symposium on Advanced Robotics and Automation (WRC SARA), Beijing, China, 2019, pp. 7-12 (Year: 2019).*

T. T. Andersen, H. B. Amor, N. A. Andersen and O. Ravn, "Measuring and Modelling Delays in Robot Manipulators for Temporally Precise Control Using Machine Learning," 2015 IEEE 14th International Conference on Machine Learning and Applications (ICMLA), Miami, FL, USA, 2015, pp. 168-175 (Year: 2015).*

Moveit, "Moving robots into the future", https://moveit.ros.org/; 8 pages, retrieved on Nov. 1, 2021.

B. K. P. Horn et al., "Determining Optical Flow", Massachusetts Institute of Technology, Artificial Intelligence Laboratory, A. I. Memo No. 572, Apr. 1980, 28 pages.

Dan et al., "Moving Object Tracking Method Based on Improved Lucas-Kanade Sparse Optical Flow Algorithm", 2017, International Smart Cities Conference (ISC2), 2017, pp. 1-5.

L. Matthies et al., "Kalman Filter-based Algorithms for Estimating Depth from Image Sequences" International Journal of Computer, Vision, 3, 209-236, 30 pages, 1989.

Mobileye, "Responsibility-Sensitive Safety, A mathematical model for automated vehicle safety", https://www.mobileye.com/responsibility-sensitive-safety/, retrieved on Jan. 6, 2022, 10 pages.

* cited by examiner

INTEGRITY AND SAFETY CHECKING FOR ROBOTS

TECHNICAL FIELD

The disclosure relates generally to robots, and in particular, to systems, devices, and methods that relate to integrity and safety checking for robots that may be operating in a distributed environment.

BACKGROUND

Autonomous robots are becoming increasingly widespread in work and personal environments. As the number of robots in such environments increases, so does the risk of hazardous interactions among robots and humans in shared spaces. Due to their size and cost, many robots may have limited sensing, processing, and decision-making capabilities, which means that in addition to internal systems, they may need to rely on external sensors, external systems, or external processing to operate safely. Each of these locations may introduce a number of potential failure points—on the robot, on an external system, or in communications among them—that could create critical failures in a robot's operation. In turn, this may have safety-critical impact to the environment, especially in environments where robots operate nearby other objects or even humans.

BRIEF DESCRIPTION OF THE DRAWINGS

In the drawings, like reference characters generally refer to the same parts throughout the different views. The drawings are not necessarily to scale, emphasis instead generally being placed upon illustrating the exemplary principles of the disclosure. In the following description, various exemplary aspects of the disclosure are described with reference to the following drawings, in which.

DESCRIPTION

Figure 1:
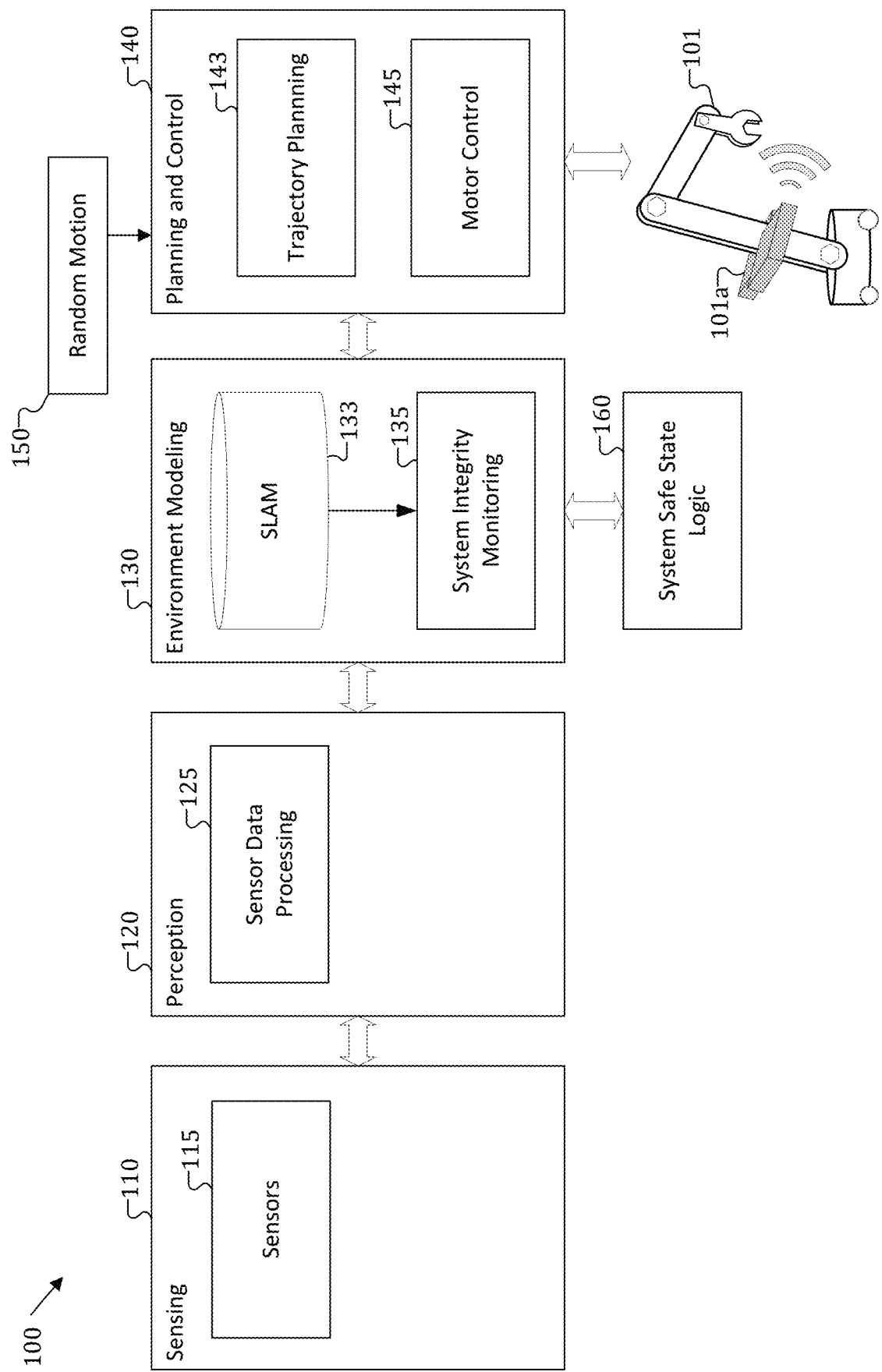
FIG. 1 shows an exemplary robot system that includes an integrity-checking system for checking the system integrity of a robot.

The following detailed description refers to the accompanying drawings that show, by way of illustration, exemplary details and features.

The word "exemplary" is used herein to mean "serving as an example, instance, or illustration". Any aspect or design described herein as "exemplary" is not necessarily to be construed as preferred or advantageous over other aspects or designs.

Throughout the drawings, it should be noted that like reference numbers are used to depict the same or similar elements, features, and structures, unless otherwise noted.

The phrase "at least one" and "one or more" may be understood to include a numerical quantity greater than or equal to one (e.g., one, two, three, four, [ . . . ], etc., where "[ . . . ]" means that such a series may continue to any higher number). The phrase "at least one of" with regard to a group of elements may be used herein to mean at least one element from the group consisting of the elements. For example, the phrase "at least one of" with regard to a group of elements may be used herein to mean a selection of: one of the listed elements, a plurality of one of the listed elements, a plurality of individual listed elements, or a plurality of a multiple of individual listed elements.

The words "plural" and "multiple" in the description and in the claims expressly refer to a quantity greater than one. Accordingly, any phrases explicitly invoking the aforementioned words (e.g., "plural [elements]", "multiple [elements]") referring to a quantity of elements expressly refers to more than one of the said elements. For instance, the phrase "a plurality" may be understood to include a numerical quantity greater than or equal to two (e.g., two, three, four, five, [ . . . ], etc., where "[ . . . ]" means that such a series may continue to any higher number).

The phrases "group (of)", "set (of)", "collection (of)", "series (of)", "sequence (of)", "grouping (of)", etc., in the description and in the claims, if any, refer to a quantity equal to or greater than one, i.e., one or more. The terms "proper subset", "reduced subset", and "lesser subset" refer to a subset of a set that is not equal to the set, illustratively, referring to a subset of a set that contains less elements than the set.

The term "data" as used herein may be understood to include information in any suitable analog or digital form, e.g., provided as a file, a portion of a file, a set of files, a signal or stream, a portion of a signal or stream, a set of signals or streams, and the like. Further, the term "data" may also be used to mean a reference to information, e.g., in form of a pointer. The term "data", however, is not limited to the aforementioned examples and may take various forms and represent any information as understood in the art.

The terms "processor" or "controller" as, for example, used herein may be understood as any kind of technological entity that allows handling of data. The data may be handled according to one or more specific functions executed by the processor or controller. Further, a processor or controller as used herein may be understood as any kind of circuit, e.g., any kind of analog or digital circuit. A processor or a controller may thus be or include an analog circuit, digital circuit, mixed-signal circuit, logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Any other kind of implementation of the respective functions, which will be described below in further detail, may also be understood as a processor, controller, or logic circuit. It is understood that any two (or more) of the processors, controllers, or logic circuits detailed herein may be realized as a single entity with equivalent functionality or the like, and conversely that any single processor, controller, or logic circuit detailed herein may be realized as two (or more) separate entities with equivalent functionality or the like.

As used herein, "memory" is understood as a computer-readable medium (e.g., a non-transitory computer-readable medium) in which data or information can be stored for retrieval. References to "memory" included herein may thus be understood as referring to volatile or non-volatile memory, including random access memory (RAM), read-only memory (ROM), flash memory, solid-state storage, magnetic tape, hard disk drive, optical drive, 3D XPoint™, among others, or any combination thereof. Registers, shift registers, processor registers, data buffers, among others, are also embraced herein by the term memory. The term "software" refers to any type of executable instruction, including firmware.

Unless explicitly specified, the term "transmit" encompasses both direct (point-to-point) and indirect transmission (via one or more intermediary points). Similarly, the term "receive" encompasses both direct and indirect reception. Furthermore, the terms "transmit," "receive," "communicate," and other similar terms encompass both physical transmission (e.g., the transmission of radio signals) and logical transmission (e.g., the transmission of digital data over a logical software-level connection). For example, a processor or controller may transmit or receive data over a software-level connection with another processor or controller in the form of radio signals, where the physical transmission and reception is handled by radio-layer components such as RF transceivers and antennas, and the logical transmission and reception over the software-level connection is performed by the processors or controllers. The term "communicate" encompasses one or both of transmitting and receiving, i.e., unidirectional or bidirectional communication in one or both of the incoming and outgoing directions. The term "calculate" encompasses both 'direct' calculations via a mathematical expression/formula/relationship and 'indirect' calculations via lookup or hash tables and other array indexing or searching operations.

A "robot" may be understood to include any type of digitally controllable machine that is designed to perform a task or tasks. By way of example, a robot may be an autonomous mobile robot (AMR) that may move within an area (e.g., a manufacturing floor, an office building, a warehouse, etc.) to perform a task or tasks; or a robot may be understood as an automated machine with arms, tools, and/or sensors that may perform a task or tasks at a fixed location; or a combination thereof. Reference is made herein to an "environment" as any area in which a robot may be located or to which it may move in order to perform tasks. As should be appreciated, an "environment" is meant to encompass any area, including, for example, a room, multiple rooms, an air duct, a plurality of air ducts, an entire floor of a building, multiple floors of a building, an entire building, multiple buildings, a factory, an airport, a shopping mall, an outdoor area, a train station, a bus terminal, etc.

As robots operate in an environment where other objects, and especially humans are also present, robots may be considered safety-critical. This may be true for mobile robots that may be moving around a crowded environment, and it may also be true for robots that are stationary, performing set stationary movements (e.g., with a robotic arm) to accomplish tasks. In both cases, the risk to humans may increase when robots are collaborating with humans in performing their tasks. To perform their tasks, robots may utilize a number of subsystems, including, for example, a sensor subsystem with numerous sensors, which may include simple positioning sensors, more complex ultrasonic distance sensors, and even more powerful depth camera systems. These sensors may be distributed among a number of communicatively-connected locations, including on robot itself, on part of the stationary infrastructure, or on other objects/robots in the environment. To ensure safe operation, a robot may employ an integrity-checking system to monitor that each of its subsystems are functioning correctly. This is particularly true for the sensor subsystem because sensors are often the robot's main source of perceiving the physical environment around it. As a result, the integrity-checking system may need to constantly monitor the integrity of its sensor processing pipeline.

The common way to ensure that all subsystems are working properly is for an integrity-checking system to use redundancy. The simplest case is double redundancy, where the subsystem includes a redundant counterpart of a given component, and the integrity-checking system compares the output of the component with the output of its redundant counterpart. If there is a mismatch, the integrity-checking system may determine that a failure has occurred. For sensor processing, duplicate processing pipelines (e.g., redundant sensor hardware, redundant sensor fusion processing, redundant communications paths, etc.) may be added, where the integrity-checking system then compares the outputs of both pipelines and identifies data differences to detect failures. Redundancy, however, may require adding numerous components to the overall robot system, and it is therefore an expensive way of detecting failures. In addition, redundancy may not be able to detect errors in cases where the robot has stopped moving, the communication pipeline is frozen, the mechanical actuators of the robot have jammed, the robot's motion is repetitive, or if a malicious attacker has infiltrated the redundancy system to fabricate a match. Each of these potential problems may be a significant weakness in integrity-checking system based on redundancy.

By contrast to redundancy, as should be apparent from detailed description that follows, the integrity-checking system disclosed herein provides for system integrity checking without the need for redundancy and its associated added costs. This improved integrity-checking system may inject predefined control commands (e.g., a pseudorandom movement component) into the robot's motion control pipeline, and by monitoring the activity for the expected observation of the injected control command compared with the current state (e.g., comparing the current activity with the expected reaction), the disclosed integrity-checking system may detect possible faults throughout the robot's sensor subsystem. Advantageously, such integrity checking may schedule checks to occur by time, task, use case, environment, etc., depending on the safety needs of the environment. In addition, by removing the need for redundancy, the disclosed integrity-checking system may have a reduced number of components (and associated costs). In addition, the disclosed integrity-checking system may be able to monitor the entire sensor subsystem (e.g., sensor hardware, sensor processing, motion control, mechanical actuators on the robot, the communication channels for transmitting information among the distributed system, etc.) rather than just discrete portions, as would be the case with a redundancy-based system. As such, a single integrity check may check a larger portion of the robot's system.

FIG. 1 shows a robot system 100 that includes an improved integrity-checking system for checking the system integrity of a robot (e.g., robot 101). Robot system 100 may include a number of subsystems that may be distributed across numerous locations, including, for example, on the robot itself, on an edge or cloud-based server, on other robots, on infrastructure equipment, etc. In addition, robot system 100 may include receivers, transmitters, and/or transceivers (e.g., a wireless modem) for communicating information among the distributed processing locations. Robot system 100 may also store system information (e.g., sensor data, localization data, object data, perception data, environmental modeling data, planning data, motion control data, program instructions, etc.) in a memory in order to facilitate storage and transfer of the information. Robot system 100 may include a sensing system 110 (which may utilize sensor data from any number of sensors (e.g., cameras, depth sensors, motion detectors, light ranging and detection (LiDAR) sensors, radar sensors, infrared sensors, etc.), a perception system 120, an environment modeling system 130, a planning and control system 140, and a communications system for communicating among these various subsystems. Each of these systems (and their underlying components and subsystems) may be a source of error in the overall operation of the robot.

To perform an integrity check, the integrity-checking system of robot system 100 may include a random motion module 150, a system integrity monitoring module 135, and a system safe state logic module 160. The integrity-checking system may utilize the random motion module 150 to inject a predefined motion into the robot's motion control system (e.g., through the planning and control module 140) to occur at a predefined test time. The system integrity monitoring module 135 may generate an expected observation associated with the predefined motion instruction (e.g., determine the expected contents of the sensor data when the predefined motion is actually executed by the robot, using, for example, the environment modeling system 130), and provide this information to a system safe state logic module 160. The robot system 100 transmits (e.g., via a transmitter that is part of its communication system) to the robot 101 for execution at the predefined test time. Then, the system safe state logic module 160 may observe the current activity of robot 101 (e.g., using sensors 115 of the sensing subsystem 110, which may include on-robot sensors that are part a sensing and processing module 101a) while robot 101 executes the predefined motions at the predefined test time. The system safe state logic module 160 may then compare the actual observations of the predefined motion (e.g., a current observation at the test time) with the expected results for the predefined motion. If the difference exceeds a predefined threshold, the integrity-checking system may determine that a fault exists in the robot system (e.g., a systematic failure), and the robot system 100 may generate a mitigating instruction to stop or modify the operation of robot 101 until fault has been repaired. The robot system 100 may perform such an integrity check continuously (e.g., in real-time), at time-based intervals (e.g., regular intervals, irregular intervals, a predefined schedule, etc.), and/or based on a triggering event (e.g., an alarm-based threshold is met, motion is detected, etc.).

The predefined motion instruction from the random motion module 150 may be described herein as providing instructions for the robot (e.g., robot 101) to perform a "random" motion. The motion is described as "random" because the associated motions should not involve a repetitive motion pattern (e.g., it should differ from the normal motion of the robot in a random way). The random motion provided in the predefined motion instruction may include a pseudorandom motion, and the integrity-checking system may tailor the random motion in terms of speed, amplitude, trajectory, etc., so that sensing system 110 may detect the observations associated with the predefined motion. In addition, the integrity-checking system may coordinate (e.g., with the planning and control module 140), to incorporate the random motion into the robot's task-related motion by modifying the task related motion in a "random" way. This means that random motion module 150 may generate, for example, the random motion modification through a pseudorandom number generator (e.g., a conventional rand( ) function, as used in conventional programming languages) to avoid the "normal" motion patterns (e.g., the repetitive patterns) carried out by robot 101 during its planned tasks.

Because robots may be able to accomplish their planned task in a variety of ways, the predefined motion instruction may be any type of motion instruction that deviates from the robot's normal (e.g., typical) motions in an observable way, while still allowing the robot to accomplish its planned task. For example, if the robot's task involves moving the tool-center-point (TCP) of a manipulator to reach a particular target position or pose (e.g., irrespective of the trajectory), the random motion module 150 may modify the normal or typical trajectory that the robot uses to accomplish the task with a modified trajectory that causes the TCP of the manipulator to arrive at the same target pose. As another example, the random motion module 150 may modify a robot's normal path (e.g., adding a waypoint to the path, adding a superfluous motion within the path, etc.) for picking up an object and delivering it to a target location. As another example, a robot with a multi jointed robotic arm may be able to accomplish the same task using different joint configurations of the jointed robotic arm (e.g., each joint's angle in relation to each other joint's angle), and the random motion module 150 may cause the joint configuration to deviate from the typical joint configuration used by the robot for the particular task.

As should be appreciated, the integrity-checking system may generate the random motion based on, for example, the coverage of the sensors used to observe the actual motions of the robot. For example, a mobile robot may normally pass a particular camera such that the camera typically observes the robot within the same region of the images captured by the camera. The random motion module 150 may generate and adapted motion instruction causing the robot to move along a different trajectory such that the camera observes the robot within a different region of the images captured by the camera. As should be appreciated, using this type of random motion, the integrity-checking system may be able to detect not only a general failure of the camera, but also a partial failure (e.g., a region of dead pixels, partial obstruction of the lens, etc.) that may not have been detected if the robot were to always pass through the same region in the images captured by the camera.

The integrity-checking system may also use the random motion to detect unexpected/unsafe latencies within the overall system. For example, if the random motion module 150 uses a uniquely identifiable random motion, the integrity-checking system may be able to determine the latency by observing, for example, the pattern and timing of the uniquely identifiable motion. For example, the random motion module 150 may add a uniquely-identifiable S-shaped path as compared to a robot's otherwise straight trajectory. The integrity-checking system may determine the latency by observing how well the expected S-shaped path conforms to the observed S-shaped path in terms of its shape, timing, etc. compared to predefined thresholds for those observations. As another example, the integrity-checking system may trigger at the same test time a random motion for multiple robots that the sensing system 112 may be able to observe simultaneously. The integrity-checking system may determine the latency by observing whether there is a threshold timing difference in the two robot's execution of the random motion.

The integrity-checking system may also use a random motion that is a fault-specific motion pattern. In other words, the integrity-checking system may design the random motions so that it may localize any detected fault to a particular subsystem, component, sensor, etc. The integrity-checking system may specifically design the random motion pattern to stress-test a particular portion of the overall robot system while reducing other factors that may mask faults.

The integrity-checking system may also use multiple robots to check each other's systems for potential failures. For example, the random motion module 150 may generate a predefined sequence of motions that instructs two (or more) robots to execute a series of coordinated motions. For example, the predefined sequence may involve a first robot (e.g., robot A) moving into a second robot's (e.g., robot B's) field of view. When robot B detects that robot A has moved into its field of view, robot B may send, as part of the predefined sequence, an instruction to robot A to start a predefined motion pattern (e.g., raise its robotic arm). As part of the predefined sequence, robot B may then detect this predefined motion pattern (e.g., detects that robot A has raised its robotic arm) and respond with a second predefined motion pattern (e.g., raise both of its robotic arms). The integrity-checking system may utilize an infrastructure camera (or any sensor of the sensing system 110 which may detect robot A's and robot B's movements), to detect both motion patterns, the latency between each step, and compare each to predefined thresholds for the expected results. The integrity-checking system may indicate a fault if any observed results exceed the predefined thresholds.

In addition to injecting "random" motion to check integrity of the system, the integrity-checking system may use an optic flow technique to verify the integrity of a camera sensor that may be located on the robot (e.g., part of the sensing and processing module 101a of robot 101), the processing and perception pipeline of the robot system, the robot's motion control system, or the actuators on the robot (e.g., the motors used for motions of robot 101). The term "optic flow" is well-known to those of skill in the art of camera-based sensing and motion systems. Generally, optic flow refers to a two-dimensional vector field that describes the motion of individual points (e.g., pixels) in the image plane of images captured by a camera. Camera-based sensing systems may measure optic flow from an image sequence by a variety of well-known methods, such as by solving for local brightness constraints for every pixel in a sequence of images (e.g., dense flow) or by tracking individual feature points in a sequence of images (e.g., sparse flow).

In addition to measuring optic flow, camera-based sensing systems may predict optic flow for a static environment using the scene geometry and the camera motion, using, for example, the following equation:

$$\begin{bmatrix} \dot{x} \\ \dot{y} \end{bmatrix} = \frac{1}{Z} \begin{bmatrix} T_z x - T_x \\ T_z y - T_y \end{bmatrix} + \omega_t \begin{bmatrix} xy \\ y^2 + 1 \end{bmatrix} - \omega_y \begin{bmatrix} x^2 + 1 \\ xy \end{bmatrix} - \omega_z \begin{bmatrix} -y \\ x \end{bmatrix}$$

As should be apparent from the above equation, the vector field may depend on a six-dimensional set of motion parameters ($T_x$, $T_y$, $T_z$, $\omega_x$, $\omega_y$, $\omega_z$) and on the distance of scene-points Z. Many camera-based perception systems, frequently used in automated or partially automated movement systems, may utilize the above-listed equation to perform simultaneous localization and motion (SLAM) processing as part of its environment modeling subsystem. For example, as shown in FIG. 1, robot system 100 includes a SLAM processing system 133 as part of its environmental modeling system 130 for normal operation of robot 101 (e.g., for autonomous movements, navigation, etc.). As will be discussed in more detail below, the integrity-checking system may utilize this already-calculated optic flow to perform integrity checking on the sensor processing and perception pipeline.

Figure 2:
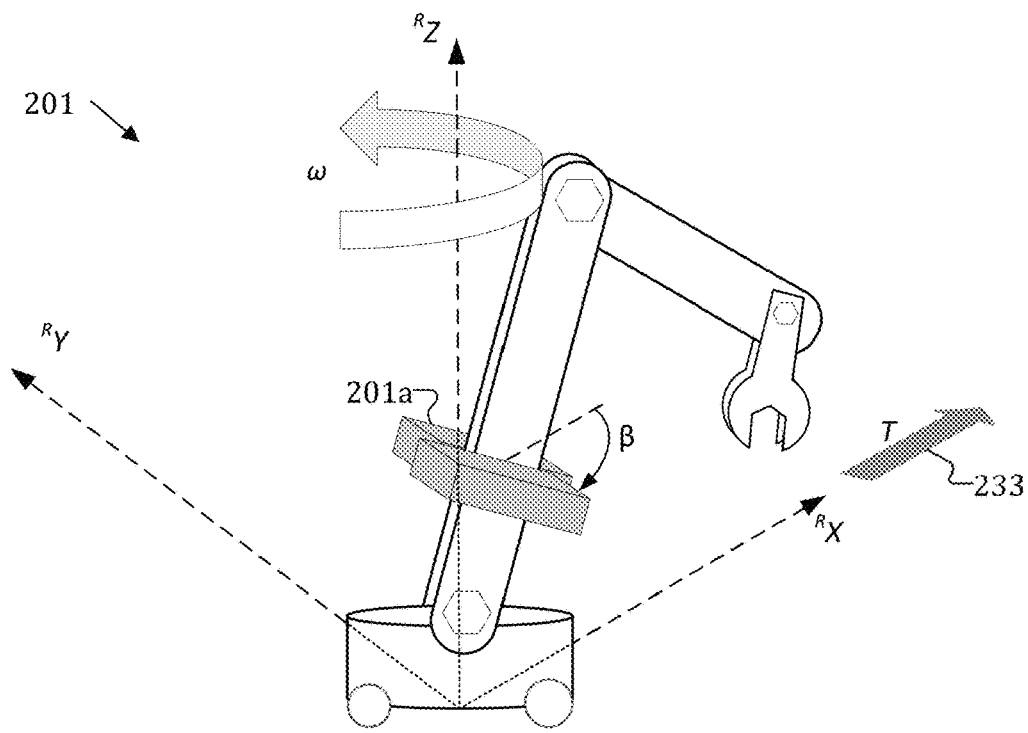
FIG. 2 depicts an exemplary robot for a robot system that may utilize optic flow.

FIG. 2 shows a robot 201 that may utilize optic flow as part of its automated system. Without limitation, robot 201 may be an implementation of robot 101 and may be part of robot system 100. Robot 201 may include a sensor and processing module 201a that may include a camera mounted on robot 201 used for optic flow processing. As exemplarily depicted in FIG. 2, robot 201 may move within an environment according to a six-dimensional set of motion parameters (e.g., in robot coordinates, $T_x$, $T_y$, $T_z$, $\omega_x$, $\omega_y$, $\omega_z$). But because the robot 201 operates with knowledge of its own pose and trajectory 233 (T), the system may reduce the six-dimensional set of motion parameters to a one- or two-dimensional translation vector T and one rotational motion parameter around the Z-axis of robot 201. As such, the system may decompose the optic flow field into a first component that depends only on the translation vector T and scene depth, Z, and a second component that depends only on the rotation. Since the rotational component is completely independent from the scene geometry, the system may predict the rotational component from the robot's rotation speed, as known by the robot from its own operating parameters. Subtracting this predicted rotation from the measured optic flow results in a simplified optic flow field that depends only on the translation vector T and the scene depth, Z.

Figure 3:
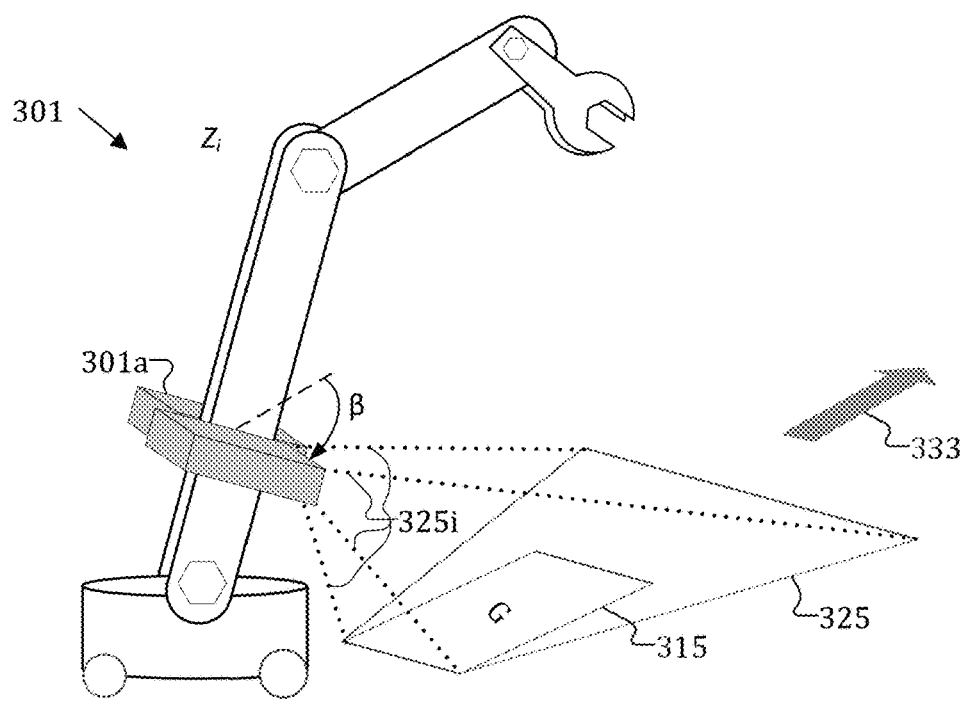
FIG. 3 depicts an exemplary robot for a robot system that may use a ground window for integrity-checking.

The integrity-checking system may then use a ground window to further simplify the optic flow field. The ground window may define an area along the trajectory of the robot that the integrity-checking system assumes to be free of obstacles. As shown in FIG. 3, ground window 301 (also denoted as G) is an area along the trajectory 333 of robot 301 that the integrity-checking system assumes to be free of obstacles. Ideally, the integrity-checking system may define the ground window 301 by a width that is as least as wide as the physical width of the robot itself and a length that is at least as long as the safe-braking distance of the robot. Using this ground window and the camera angle relative to the ground plane ($\beta$), the integrity-checking system may calculate all scene depth values ($Z_i$), e.g., scene depth values 325i, for the ground plane 325, Z, using the following equation:

$$Z_G(p) = \frac{h}{\cos\beta y + \sin\beta}$$

As a result, the integrity-checking system may predict the expected translational optic flow field within the ground plane (e.g., ground plane 325) and compare it to the measured optic flow field. Though the integrity-checking system may use any number of methods to compare the predicted expected translational optic flow field to the measured optic flow field, one such method is to sum the Euclidian distances between every predicted vector and every corresponding measured vector, and then compare the sum to a predetermined threshold. If the sum exceeds the predetermined threshold, the integrity-checking system may determine that a fault exists in the robot system (e.g., a systematic failure) and stop or modify the operation of robot until the fault has been repaired. This type of optic flow integrity-checking may be particularly advantageous because it may introduce only a relatively small computational overhead to the overall system because it is able to repurpose the already-calculated optic flow, that the system may have already calculated as part of, for example, a SLAM algorithm. If the robot system has already calculated the optic flow for other purposes, the robot system may additionally execute optic flow integrity-checking using relatively low-performance processors that may be located, for example inside the robot. Of course, as with other aspects of the robot's system and as noted above, the optic flow integrity-checking may be processed at any location in a distributed system.

Figure 4:
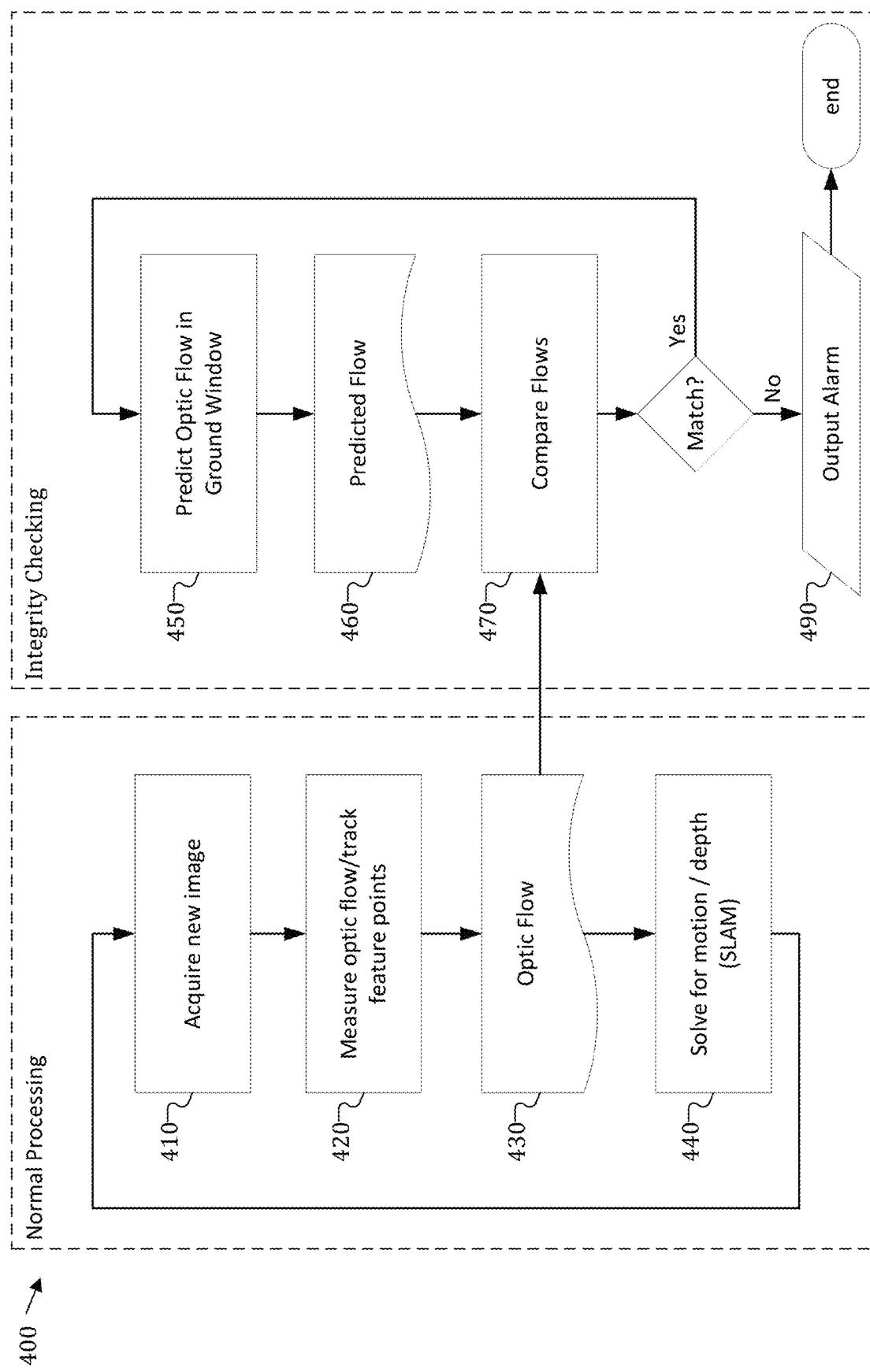
FIG. 4 shows an exemplary flow diagram for checking the system integrity of a robot system using optic flow.

FIG. 4 shows a flow diagram 400 for checking the system integrity of a robot system. It should be appreciated that FIG. 4 is merely exemplary and is not intended to limit safety system 100, which may be implemented in any number of ways and may have any or none of the aspects discussed below with respect to flow diagram 400.

As shown on the left side of FIG. 4, the robot may perform "normal" processing for motions and movements associated with performing its designated tasks. As part of this "normal" processing, the robot system may, in 410, acquire (e.g., via sensor data) a new image of the environment around the robot, and in particular, an image of the environment along the trajectory of the robot. Next, the robot system may, in 420, measure the optic flow associated with the new image to obtain a measured optic flow field 430. The robot system may use, in 440, the measured optic flow field 430 to solve for motion and depth (e.g., as part of a SLAM routine in the robot's environmental modeling system), or for other normal processing purpose. The robot system may also provide the measured optic flow field 430 to an integrity-checking system, as shown on the right side of FIG. 4. The integrity-checking system may, in 450, monitor a predicted optic flow field associated with a "ground window" to obtain a predicted optic flow field 460, as discussed above. In 470, the robot system may compare the measured optic flow field 430 with the predicted optic flow field 450. If the comparison reveals differences (e.g., that exceed a predefined threshold), the robot system may determine that a fault exists (e.g., a systematic failure) and issue, in 490, an alarm or other mitigating instruction (e.g., to stop or modify the operation of robot until the fault has been repaired).

Figure 5:
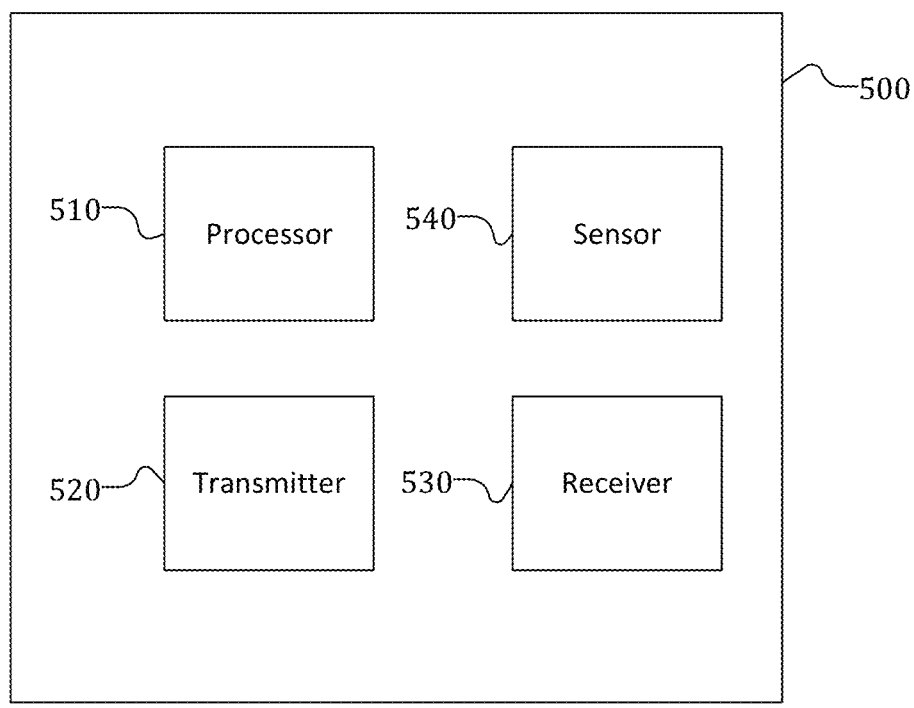
FIG. 5 illustrates an exemplary schematic drawing for a device that checks the system integrity of a robot system.

FIG. 5 is a schematic drawing illustrating a device 500 for checking the integrity of a robot system. The device 500 may include any of the features discussed above with respect to robot system 100; robots 101, 201, 301; and flow diagram 400. FIG. 5 may be implemented as a device, a system, a method, and/or a computer readable medium that, when executed, performs the features of the safety systems described above. It should be understood that device 500 is only an example, and other configurations may be possible that include, for example, different components or additional components.

Device 500 includes a processor 510 configured to generate a predefined motion instruction for a robot, wherein the predefined motion instruction instructs the robot to perform a random movement at a test time, wherein the random movement is associated with an expected observation at the test time. In addition to or in combination with any of the features described in this or the following paragraphs, processor 510 is also configured to determine a systematic failure based on a difference between the expected observation and a current observation of the robot at the test time, wherein the current observation is determined from received sensor data.

Furthermore, in addition to or in combination with any one of the features of this and/or the preceding paragraph, device 500 may further include a transmitter 520 configured to transmit the predefined motion instruction to the robot.

Furthermore, in addition to or in combination with any one of the features of this and/or the preceding paragraph, device 500 may further include a receiver 530 configured to receive the received sensor data indicative of the current observation of the robot at the test time. Furthermore, in addition to or in combination with any one of the features of this and/or the preceding paragraph, the systematic failure may include at least one of a sensor failure of a sensor 540, wherein the receiver 530 is configured to receive the sensor data from sensor 540, a manipulator failure in a manipulator of the robot that is configured to perform the random movement, a processing failure of the processor 510 that is configured to determine the difference, a transmission failure in the transmitter 520 that is configured to transmit the predefined motion instruction to the robot. Furthermore, in addition to or in combination with any one of the features of this and/or the preceding paragraph, the random movement at the test time may include a modification to a trajectory plan of the robot, wherein the trajectory plan may include movement instructions for a work task of the robot.

Furthermore, in addition to or in combination with any one of the features of this and/or the preceding two paragraphs, the work task may include movement of a manipulator of the robot from a start position to a target position. Furthermore, in addition to or in combination with any one of the features of this and/or the preceding two paragraphs, the target position may include a tool center point of the manipulator. Furthermore, in addition to or in combination with any one of the features of this and/or the preceding two paragraphs, the modification to the trajectory plan may include a modified path of the manipulator from the start position to the target position, wherein the modified path is different from a typical path of the manipulator defined by the trajectory plan. Furthermore, in addition to or in combination with any one of the features of this and/or the preceding two paragraphs, the modification to the trajectory plan may include a modified joint configuration of the manipulator at the target position, wherein the modified joint configuration is different from a typical joint configuration of the manipulator at the target position defined by the trajectory plan. Furthermore, in addition to or in combination with any one of the features of this and/or the preceding two paragraphs, the modified joint configuration of the manipulator at the target position may include a joint angle of the manipulator at the target position.

Furthermore, in addition to or in combination with any one of the features of this and/or the preceding three paragraphs, the work task may include movement of the robot from a starting location to a target location. Furthermore, in addition to or in combination with any one of the features of this and/or the preceding three paragraphs, the modification to the trajectory plan may include a modified path of the robot from the starting location to the target location, wherein the modified path of the robot is different from a typical path of the robot defined by the trajectory plan. Furthermore, in addition to or in combination with any one of the features of this and/or the preceding three paragraphs, device 500 may be incorporated into the robot. Furthermore, in addition to or in combination with any one of the features of this and/or the preceding three paragraphs, device 500 may further include a sensor 540, wherein the receiver 530 is configured to receive the received sensor data from the sensor 540. Furthermore, in addition to or in combination with any one of the features of this and/or the preceding three paragraphs, sensor 540 may include at least one of a depth sensor, a camera, a radar, a light ranging and detection sensor, or an ultrasonic senor.

Furthermore, in addition to or in combination with any one of the features of this and/or the preceding four paragraphs, receiver 530 may be further configured to receive second sensor data indicative of the current observation of the robot at the test time, wherein the second sensor data is associated with a second sensor and the received sensor data is associated with a first sensor 540, wherein the first sensor 540 is different from the second sensor, wherein processor 510 may be configured to determine a latency difference between the first sensor 540 and the second sensor based on the received sensor data and the second sensor data. Furthermore, in addition to or in combination with any one of the features of this and/or the preceding four paragraphs, the random movement may include a uniquely identifiable movement. Furthermore, in addition to or in combination with any one of the features of this and/or the preceding four paragraphs, processor 510 may be configured to generate a second predefined motion instruction for a second robot, wherein the second predefined motion instruction instructs the second robot to perform the random movement at the test time, wherein processor 510 may be configured to determine an execution delay based on a difference between the first observation and a second current observation based on received second sensor data indicative of the second current observation of the second robot at the test time.

Furthermore, in addition to or in combination with any one of the features of this and/or the preceding five paragraphs, the random movement may include a fault-specific motion pattern. Furthermore, in addition to or in combination with any one of the features of this and/or the preceding five paragraphs, processor 510 may be configured to generate a second predefined motion instruction for a second robot, wherein the second predefined motion instruction may include a second random movement for the second robot, is coordinated with the predefined motion instruction, and is associated with a second expected observation at a response time that is after the test time, wherein the receiver 530 is further configured to receive sensor data indicative of a second current observation of the second robot at the response time, wherein processor 510 may be configured to determine the systematic failure further based a second difference between the second expected observation and the second current observation. Furthermore, in addition to or in combination with any one of the features of this and/or the preceding five paragraphs, processor 510 may be further configured to generate a normal movement instruction for the robot, wherein the normal movement instruction instructs the robot to follow a trajectory at a movement speed, wherein the trajectory and the movement speed are associated with an expected optic flow along the trajectory, wherein processor 510 may be configured to determine the systematic failure based on a difference between the expected optic flow and a measured optic flow, wherein the measured optic flow is based on received optic sensor data.

Furthermore, in addition to or in combination with any one of the features of this and/or the preceding five paragraphs, processor 510 may be configured to determine the expected optic flow based on the normal movement instruction and a ground window defined by a width of the robot and a forward length along the trajectory of the robot. Furthermore, in addition to or in combination with any one of the features of this and/or the preceding five paragraphs, the forward length may include a safe braking distance needed for the robot to stop movement along the trajectory.

Figure 6:
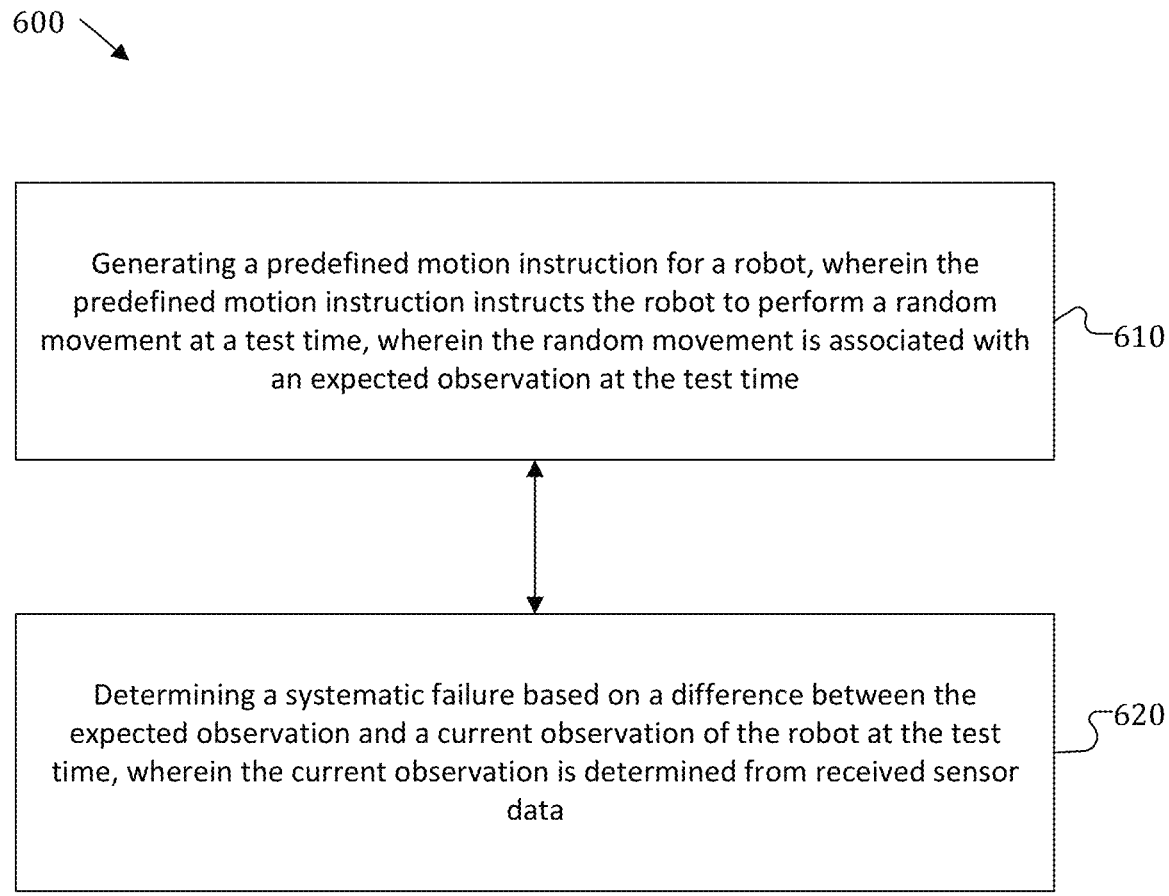
FIG. 6 illustrates an exemplary schematic flow diagram of a method for integrity-checking a robot system.

FIG. 6 depicts a schematic flow diagram of a method 600 for integrity-checking a robot system. Method 600 may implement any of the robot system features described above with respect to robot system 100; robots 101, 201, 301; flow diagram 400; and device 500.

Method 600 includes, in 610, generating a predefined motion instruction for a robot, wherein the predefined motion instruction instructs the robot to perform a random movement at a test time, wherein the random movement is associated with an expected observation at the test time. Method 600 also includes, in 620, determining a systematic failure based on a difference between the expected observation and a current observation of the robot at the test time, wherein the current observation is determined from received sensor data.

In the following, various examples are provided that may include one or more aspects described above with respect to robot system 100; robots 101, 201, 301; flow diagram 400; device 500; and method 600. The examples provided in relation to the devices may apply also to the described method(s), and vice versa.

Example 1 is a device including a processor configured to generate a predefined motion instruction for a robot, wherein the predefined motion instruction instructs the robot to perform a random movement at a test time, wherein the random movement is associated with an expected observation at the test time. The processor is also configured to determine a systematic failure based on a difference between the expected observation and a current observation of the robot at the test time, wherein the current observation is determined from received sensor data.

Example 2 is the device of example 1, further including a transmitter configured to transmit the predefined motion instruction to the robot.

Example 3 is the device of either of examples 1 or 2, further including a receiver configured to receive the received sensor data indicative of the current observation of the robot at the test time.

Example 4 is the device of any one of examples 1 to 3, wherein the systematic failure includes at least one of a sensor failure of a sensor that provides the received sensor data, a manipulator failure in a manipulator of the robot that is configured to perform the random movement, a processing failure of the processor that is configured to determine the difference, a transmission failure in the transmitter that is configured to transmit the predefined motion instruction to the robot.

Example 5 is the device of any one of examples 1 to 4, wherein the random movement at the test time includes a modification to a trajectory plan of the robot, wherein the trajectory plan includes movement instructions for a work task of the robot.

Example 6 is the device of example 5, wherein the work task includes movement of a manipulator of the robot from a start position to a target position.

Example 7 is the device of example 6, wherein the target position includes a tool center point of the manipulator.

Example 8 is the device of either example 6 or 7, wherein the modification to the trajectory plan includes a modified path of the manipulator from the start position to the target position, wherein the modified path is different from a typical path of the manipulator defined by the trajectory plan.

Example 9 is the device of any one of examples 6 to 8, wherein the modification to the trajectory plan includes a modified joint configuration of the manipulator at the target position, wherein the modified joint configuration is different from a typical joint configuration of the manipulator at the target position defined by the trajectory plan.

Example 10 is the device of example 9, wherein the modified joint configuration of the manipulator at the target position includes a joint angle of the manipulator at the target position.

Example 11 is the device of any one of examples 7 to 10, wherein the work task includes movement of the robot from a starting location to a target location.

Example 12 is the device of example 11, wherein the modification to the trajectory plan includes a modified path of the robot from the starting location to the target location, wherein the modified path of the robot is different from a typical path of the robot defined by the trajectory plan.

Example 13 is the device of any one of examples 1 to 12, wherein the device is incorporated into the robot.

Example 14 is the device of any one of examples 1 to 13, wherein the processor is further configured to generate a mitigating instruction to stop or modify operation of the robot.

Example 15 is the device of any one of examples 1 to 14, further including a sensor, wherein the receiver is configured to receive the received sensor data from the sensor.

Example 16 is the device of example 15, wherein the sensor includes at least one of a depth sensor, a camera, a radar, a light ranging and detection sensor, or an ultrasonic sensor.

Example 17 is the device of any one of examples 3 to 16, wherein the receiver is further configured to receive second sensor data indicative of the current observation of the robot at the test time, wherein the second sensor data is associated with a second sensor and the sensor data is associated with a first sensor, wherein the first sensor is different from the second sensor, wherein the processor is configured to determine a latency difference between the first sensor and the second sensor based on the received sensor data and the second sensor data.

Example 18 is the device of any one of examples 1 to 17, wherein the random movement includes a uniquely identifiable movement.

Example 19 is the device of any one of examples 1 to 18, wherein the processor is configured to generate a second predefined motion instruction for a second robot, wherein the second predefined motion instruction instructs the second robot to perform the random movement at the test time, wherein the processor is configured to determine an execution delay based on a difference between the first observation and a second current observation based on received second sensor data indicative of the second current observation of the second robot at the test time.

Example 20 is the device of any one of examples 1 to 19, wherein the random movement includes a fault-specific motion pattern.

Example 21 is the device of any one of examples 3 to 20, wherein the processor is configured to generate a second predefined motion instruction for a second robot, wherein the second predefined motion instruction includes a second random movement for the second robot, is coordinated with the predefined motion instruction, and is associated with a second expected observation at a response time that is after the test time, wherein the receiver is further configured to receive sensor data indicative of a second current observation of the second robot at the response time, wherein the processor is configured to determine the systematic failure further based a second difference between the second expected observation and the second current observation.

Example 22 is the device of any one of examples 1 to 21, wherein the processor is further configured to generate a normal movement instruction for the robot, wherein the normal movement instruction instructs the robot to follow a trajectory at a movement speed, wherein the trajectory and the movement speed are associated with an expected optic flow along the trajectory, wherein the processor is configured to determine the systematic failure based on a difference between the expected optic flow and a measured optic flow, wherein the measured optic flow is based on received optic sensor data.

Example 23 is the device of example 22, wherein the processor is configured to determine the expected optic flow based on the normal movement instruction and a ground window defined by a width of the robot and a forward length along the trajectory of the robot.

Example 24 is the device of example 23, wherein the forward length includes a safe braking distance needed for the robot to stop movement along the trajectory.

Example 25 is an apparatus including a processor configured to generate a motion instruction for a robot, wherein the motion instruction instructs the robot to follow a trajectory at a movement speed, wherein the trajectory and movement speed are associated with an expected observation along the trajectory, wherein the expected observation includes an expected optic flow of the trajectory. The processor is also configured to determine a systematic failure based on a difference between the expected observation and a current observation of the robot along the trajectory, wherein the current observation includes a measured optic flow for an image sequence of the trajectory determined from received optic data.

Example 26 is the apparatus of example 25, further including a transmitter configured to transmit the motion instruction to the robot.

Example 27 is the apparatus of either of examples 25 or 26, further including a receiver configured to receive the received optic data indicative of the current observation of the robot at the test time.

Example 28 is the apparatus of any one of examples 25 to 27, wherein the processor is configured to determine the expected optic flow based on the motion instruction and a ground window defined by a width of the robot and a forward length along the trajectory of the robot.

Example 29 is the apparatus of example 28, wherein the forward length includes a safe braking distance needed for the robot to stop moving along the trajectory.

Example 30 is the apparatus of any one of examples 25 to 29, wherein the processor is further configured to generate a mitigating instruction to stop or modify operation of the robot.

Example 31 is a method that includes generating a predefined motion instruction for a robot, wherein the predefined motion instruction instructs the robot to perform a random movement at a test time, wherein the random movement is associated with an expected observation at the test time. The method also determines a systematic failure based on a difference between the expected observation and a current observation of the robot at the test time, wherein the current observation is determined from received sensor data.

Example 32 is the method of example 31, further including transmitting the predefined motion instruction to the robot.

Example 33 is the method of either of examples 31 or 32, further including receiving the received sensor data indicative of the current observation of the robot at the test time.

Example 34 is the method of any one of examples 31 to 33, wherein the systematic failure includes at least one of a sensor failure of a sensor that provides the received sensor data, a manipulator failure in a manipulator of the robot, a processing failure of a processor, a transmission failure in transmitting the predefined motion instruction to the robot.

Example 35 is the method of any one of examples 31 to 34, wherein the random movement at the test time includes a modification to a trajectory plan of the robot, wherein the trajectory plan includes movement instructions for a work task of the robot.

Example 36 is the method of example 35, wherein the work task includes movement of a manipulator of the robot from a start position to a target position.

Example 37 is the method of example 36, wherein the target position includes a tool center point of the manipulator.

Example 38 is the method of either example 36 or 37, wherein the modification to the trajectory plan includes a modified path of the manipulator from the start position to the target position, wherein the modified path is different from a typical path of the manipulator defined by the trajectory plan.

Example 39 is the method of any one of examples 36 to 38, wherein the modification to the trajectory plan includes a modified joint configuration of the manipulator at the target position, wherein the modified joint configuration is different from a typical joint configuration of the manipulator at the target position defined by the trajectory plan.

Example 40 is the method of example 39, wherein the modified joint configuration of the manipulator at the target position includes a joint angle of the manipulator at the target position.

Example 41 is the method of any one of examples 37 to 40, wherein the work task includes movement of the robot from a starting location to a target location.

Example 42 is the method of example 41, wherein the modification to the trajectory plan includes a modified path of the robot from the starting location to the target location, wherein the modified path of the robot is different from a typical path of the robot defined by the trajectory plan.

Example 43 is the method of any one of examples 31 to 42, further including generating a mitigating instruction to stop or modify operation of the robot.

Example 44 is the method of any one of examples 31 to 43, wherein the received sensor data is received from a sensor.

Example 45 is the method of example 44, wherein the sensor includes at least one of a depth sensor, a camera, a radar, a light ranging and detection sensor, or an ultrasonic senor.

Example 46 is the method of any one of examples 33 to 45, further including receiving second sensor data indicative of the current observation of the robot at the test time, wherein the second sensor data is associated with a second sensor and the sensor data is associated with a first sensor, wherein the first sensor is different from the second sensor, wherein the method further includes determining a latency difference between the first sensor and the second sensor based on the received sensor data and the second sensor data.

Example 47 is the method of any one of examples 31 to 46, wherein the random movement includes a uniquely identifiable movement.

Example 48 is the method of any one of examples 31 to 47, further including generating a second predefined motion instruction for a second robot, wherein the second predefined motion instruction instructs the second robot to perform the random movement at the test time, wherein the method further includes determining an execution delay based on a difference between the first observation and a second current observation based on received second sensor data indicative of the second current observation of the second robot at the test time.

Example 49 is the method of any one of examples 31 to 48, wherein the random movement includes a fault-specific motion pattern.

Example 50 is the method of any one of examples 33 to 49, further including generating a second predefined motion instruction for a second robot, wherein the second predefined motion instruction includes a second random movement for the second robot, is coordinated with the predefined motion instruction, and is associated with a second expected observation at a response time that is after the test time, wherein the receiver is further configured to receive sensor data indicative of a second current observation of the second robot at the response time, wherein the method further includes determining the systematic failure further based a second difference between the second expected observation and the second current observation.

Example 51 is the method of any one of examples 31 to 50, further including generating a normal movement instruction for the robot, wherein the normal movement instruction instructs the robot to follow a trajectory at a movement speed, wherein the trajectory and the movement speed are associated with an expected optic flow along the trajectory, wherein the method further includes determining the systematic failure based on a difference between the expected optic flow and a measured optic flow, wherein the measured optic flow is based on received optic sensor data.

Example 52 is the method of example 51, further including determining the expected optic flow based on the normal movement instruction and a ground window defined by a width of the robot and a forward length along the trajectory of the robot.

Example 53 is the method of example 52, wherein the forward length includes a safe braking distance needed for the robot to stop movement along the trajectory.

Example 54 is a method that includes generating a motion instruction for a robot, wherein the motion instruction instructs the robot to follow a trajectory at a movement speed, wherein the trajectory and movement speed are associated with an expected observation along the trajectory, wherein the expected observation includes an expected optic flow of the trajectory. The method also includes determining a systematic failure based on a difference between the expected observation and a current observation of the robot along the trajectory, wherein the current observation includes a measured optic flow for an image sequence of the trajectory determined from received optic data.

Example 55 is the method of example 54, further including transmitting the motion instruction to the robot.

Example 56 is the method of either of examples 54 or 55, further including receiving the received optic data indicative of the current observation of the robot at the test time.

Example 57 is the method of any one of examples 54 to 56, further including determining the expected optic flow based on the motion instruction and a ground window defined by a width of the robot and a forward length along the trajectory of the robot.

Example 58 is the method of example 57, wherein the forward length includes a safe braking distance needed for the robot to stop moving along the trajectory.

Example 59 is the method of any one of examples 54 to 58, further including generating a mitigating instruction to stop or modify operation of the robot.

Example 60 is a device including a means for generating a predefined motion instruction for a robot, wherein the predefined motion instruction instructs the robot to perform a random movement at a test time, wherein the random movement is associated with an expected observation at the test time. The device also includes a means for determining a systematic failure based on a difference between the expected observation and a current observation of the robot at the test time, wherein the current observation is determined from received sensor data.

Example 61 is the device of example 60, further including a means for transmitting the predefined motion instruction to the robot.

Example 62 is the device of either of examples 60 or 61, further including means for receiving configured to receive the received sensor data indicative of the current observation of the robot at the test time.

Example 63 is the device of any one of examples 60 to 62, wherein the systematic failure includes at least one of a sensor failure of a sensing means for sensing the received sensor data, a manipulator failure in a manipulating means for manipulating objects handled by the robot, a processing failure in a means for processing, a transmission failure in the transmitting means.

Example 64 is the device of any one of examples 60 to 63, wherein the random movement at the test time includes a modification to a trajectory plan of the robot, wherein the trajectory plan includes movement instructions for a work task of the robot.

Example 65 is the device of example 64, wherein the work task includes movement of a manipulator of the robot from a start position to a target position.

Example 66 is the device of example 65, wherein the target position includes a tool center point of the manipulator.

Example 67 is the device of either example 65 or 66, wherein the modification to the trajectory plan includes a modified path of the manipulator from the start position to the target position, wherein the modified path is different from a typical path of the manipulator defined by the trajectory plan.

Example 68 is the device of any one of examples 65 to 67, wherein the modification to the trajectory plan includes a modified joint configuration of the manipulator at the target position, wherein the modified joint configuration is different from a typical joint configuration of the manipulator at the target position defined by the trajectory plan.

Example 69 is the device of example 68, wherein the modified joint configuration of the manipulator at the target position includes a joint angle of the manipulator at the target position.

Example 70 is the device of any one of examples 66 to 69, wherein the work task includes movement of the robot from a starting location to a target location.

Example 71 is the device of example 70, wherein the modification to the trajectory plan includes a modified path of the robot from the starting location to the target location, wherein the modified path of the robot is different from a typical path of the robot defined by the trajectory plan.

Example 72 is the device of any one of examples 60 to 71, further including a means for generating a mitigating instruction to stop or modify operation of the robot.

Example 73 is the device of any one of examples 60 to 72, wherein the device is incorporated into the robot.

Example 74 is the device of any one of examples 60 to 73, further including a sensing means for sensing, wherein the means for receiving includes a means for receiving the sensor data from the sensing means.

Example 75 is the device of example 74, wherein the sensing means includes at least one of a depth sensor, a camera, a radar, a light ranging and detection sensor, or an ultrasonic senor.

Example 76 is the device of any one of examples 62 to 75, wherein the means for receiving further includes a means for receiving second sensor data indicative of the current observation of the robot at the test time, wherein the second sensor data is associated with a second sensor and the sensor data is associated with a first sensor, wherein the first sensor is different from the second sensor, wherein device further includes a means for determining a latency difference between the first sensor and the second sensor based on the received sensor data and the second sensor data.

Example 77 is the device of any one of examples 60 to 76, wherein the random movement includes a uniquely identifiable movement.

Example 78 is the device of any one of examples 60 to 77, further including a means for generating a second predefined motion instruction for a second robot, wherein the second predefined motion instruction instructs the second robot to perform the random movement at the test time, wherein the device further includes a means for determining an execution delay based on a difference between the first observation and a second current observation based on received second sensor data indicative of the second current observation of the second robot at the test time.

Example 79 is the device of any one of examples 60 to 78, wherein the random movement includes a fault-specific motion pattern.

Example 80 is the device of any one of examples 62 to 79, further including a means for generating a second predefined motion instruction for a second robot, wherein the second predefined motion instruction includes a second random movement for the second robot, is coordinated with the predefined motion instruction, and is associated with a second expected observation at a response time that is after the test time, wherein the means for receiving includes a means for receiving sensor data indicative of a second current observation of the second robot at the response time, wherein the device further includes a means for determining the systematic failure further based a second difference between the second expected observation and the second current observation.

Example 81 is the device of any one of examples 60 to 80, further including a means for generating a normal movement instruction for the robot, wherein the normal movement instruction instructs the robot to follow a trajectory at a movement speed, wherein the trajectory and the movement speed are associated with an expected optic flow along the trajectory, wherein device further includes a means for determining the systematic failure based on a difference between the expected optic flow and a measured optic flow, wherein the measured optic flow is based on received optic sensor data.

Example 82 is the device of example 81, further including a means for determining the expected optic flow based on the normal movement instruction and a ground window defined by a width of the robot and a forward length along the trajectory of the robot.

Example 83 is the device of example 82, wherein the forward length includes a safe braking distance needed for the robot to stop movement along the trajectory.

Example 84 is an apparatus including means for generating a motion instruction for a robot, wherein the motion instruction instructs the robot to follow a trajectory at a movement speed, wherein the trajectory and movement speed are associated with an expected observation along the trajectory, wherein the expected observation includes an expected optic flow of the trajectory. The apparatus also includes a means for determining a systematic failure based on a difference between the expected observation and a current observation of the robot along the trajectory, wherein the current observation includes a measured optic flow for an image sequence of the trajectory determined from received optic data.

Example 85 is the apparatus of example 84, further including a means for transmitting the motion instruction to the robot.

Example 86 is the apparatus of either of examples 84 or 85, further including a means for receiving the received optic data indicative of the current observation of the robot at the test time.

Example 87 is the apparatus of any one of examples 84 to 86, further including a means for determining the expected optic flow based on the motion instruction and a ground window defined by a width of the robot and a forward length along the trajectory of the robot.

Example 88 is the apparatus of example 87, wherein the forward length includes a safe braking distance needed for the robot to stop moving along the trajectory.

Example 89 is the apparatus of any one of examples 84 to 88, wherein the processor is further configured to generate a mitigating instruction to stop or modify operations of the robot.

Example 90 is a non-transitory computer readable medium, including instructions which, if executed, cause a processor to generate a predefined motion instruction for a robot, wherein the predefined motion instruction instructs the robot to perform a random movement at a test time, wherein the random movement is associated with an expected observation at the test time. The instructions also cause the processor to determine a systematic failure based on a difference between the expected observation and a current observation of the robot at the test time, wherein the current observation is determined from received sensor data.

Example 91 is the non-transitory computer readable medium of example 90, wherein the instructions also cause a transmitter to transmit the predefined motion instruction to the robot.

Example 92 is the non-transitory computer readable medium of either of examples 90 or 91, wherein the instructions also cause a receiver to receive the received sensor data indicative of the current observation of the robot at the test time.

Example 93 is the non-transitory computer readable medium of any one of examples 90 to 92, wherein the systematic failure includes at least one of a sensor failure of a sensor that provides the received sensor data, a manipulator failure in a manipulator of the robot, a processing failure of the processor, a transmission failure in the transmitter.

Example 94 is the non-transitory computer readable medium of any one of examples 90 to 93, wherein the random movement at the test time includes a modification to a trajectory plan of the robot, wherein the trajectory plan includes movement instructions for a work task of the robot.

Example 95 is the non-transitory computer readable medium of example 94, wherein the work task includes movement of a manipulator of the robot from a start position to a target position.

Example 96 is the non-transitory computer readable medium of example 95, wherein the target position includes a tool center point of the manipulator.

Example 97 is the non-transitory computer readable medium of either example 95 or 96, wherein the modification to the trajectory plan includes a modified path of the manipulator from the start position to the target position, wherein the modified path is different from a typical path of the manipulator defined by the trajectory plan.

Example 98 is the non-transitory computer readable medium of any one of examples 95 to 97, wherein the modification to the trajectory plan includes a modified joint configuration of the manipulator at the target position, wherein the modified joint configuration is different from a typical joint configuration of the manipulator at the target position defined by the trajectory plan.

Example 99 is the non-transitory computer readable medium of example 98, wherein the modified joint configuration of the manipulator at the target position includes a joint angle of the manipulator at the target position.

Example 100 is the non-transitory computer readable medium of any one of examples 96 to 99, wherein the work task includes movement of the robot from a starting location to a target location.

Example 101 is the non-transitory computer readable medium of example 100, wherein the modification to the trajectory plan includes a modified path of the robot from the starting location to the target location, wherein the modified path of the robot is different from a typical path of the robot defined by the trajectory plan.

Example 102 is the non-transitory computer readable medium of any one of examples 90 to 101, wherein the instructions further cause the processor to generate a mitigating instruction to stop or modify operation of the robot.

Example 103 is the non-transitory computer readable medium of any one of examples 90 to 102, wherein the non-transitory computer readable medium is incorporated into the robot.

Example 104 is the non-transitory computer readable medium of any one of examples 90 to 103, wherein the instructions further cause the receiver to receive the received sensor data from a sensor.

Example 105 is the non-transitory computer readable medium of example 104, wherein the sensor includes at least one of a depth sensor, a camera, a radar, a light ranging and detection sensor, or an ultrasonic senor.

Example 106 is the non-transitory computer readable medium of any one of examples 92 to 105, wherein the instructions also cause the receiver to receive second sensor data indicative of the current observation of the robot at the test time, wherein the second sensor data is associated with a second sensor and the sensor data is associated with a first sensor, wherein the first sensor is different from the second sensor, wherein the instructions also cause the processor to determine a latency difference between the first sensor and the second sensor based on the received sensor data and the second sensor data.

Example 107 is the non-transitory computer readable medium of any one of examples 90 to 106, wherein the random movement includes a uniquely identifiable movement.

Example 108 is the non-transitory computer readable medium of any one of examples 90 to 107, wherein the instructions are also cause the processor to generate a second predefined motion instruction for a second robot, wherein the second predefined motion instruction instructs the second robot to perform the random movement at the test time, wherein the instructions are also cause the processor to determine an execution delay based on a difference between the first observation and a second current observation based on received second sensor data indicative of the second current observation of the second robot at the test time.

Example 109 is the non-transitory computer readable medium of any one of examples 90 to 108, wherein the random movement includes a fault-specific motion pattern.

Example 110 is the non-transitory computer readable medium of any one of examples 92 to 109, wherein the instructions are also cause the processor to generate a second predefined motion instruction for a second robot, wherein the second predefined motion instruction includes a second random movement for the second robot, is coordinated with the predefined motion instruction, and is associated with a second expected observation at a response time that is after the test time, wherein the instructions are also cause the receiver to receive sensor data indicative of a second current observation of the second robot at the response time, wherein the instructions are also cause the processor to determine the systematic failure further based a second difference between the second expected observation and the second current observation.

Example 111 is the non-transitory computer readable medium of any one of examples 90 to 110, wherein the instructions are also cause the processor to generate a normal movement instruction for the robot, wherein the normal movement instruction instructs the robot to follow a trajectory at a movement speed, wherein the trajectory and the movement speed are associated with an expected optic flow along the trajectory, wherein the instructions also cause the processor to determine the systematic failure based on a difference between the expected optic flow and a measured optic flow, wherein the measured optic flow is based on received optic sensor data.

Example 112 is the non-transitory computer readable medium of example 111, wherein the instructions also cause the processor to determine the expected optic flow based on the normal movement instruction and a ground window defined by a width of the robot and a forward length along the trajectory of the robot.

Example 113 is the non-transitory computer readable medium of example 112, wherein the forward length includes a safe braking distance needed for the robot to stop movement along the trajectory.

Example 114 is a non-transitory computer readable medium, including instructions which, if executed, cause a processor to generate a motion instruction for a robot, wherein the motion instruction instructs the robot to follow a trajectory at a movement speed, wherein the trajectory and movement speed are associated with an expected observation along the trajectory, wherein the expected observation includes an expected optic flow of the trajectory. The instructions also cause the processor to determine a systematic failure based on a difference between the expected observation and a current observation of the robot along the trajectory, wherein the current observation includes a measured optic flow for an image sequence of the trajectory determined from received optic data.

Example 115 is the non-transitory computer readable medium of example 114, wherein the instructions also cause a transmitter to transmit the motion instruction to the robot.

Example 116 is the non-transitory computer readable medium of either of examples 114 or 115, wherein the instructions also cause a receiver to receive the received optic data indicative of the current observation of the robot at the test time.

Example 117 is the non-transitory computer readable medium of any one of examples 114 to 116, wherein the instructions also cause the processor to determine the expected optic flow based on the motion instruction and a ground window defined by a width of the robot and a forward length along the trajectory of the robot.

Example 118 is the non-transitory computer readable medium of example 117, wherein the forward length includes a safe braking distance needed for the robot to stop moving along the trajectory.

Example 119 is the non-transitory computer readable medium of any one of examples 114 to 118, wherein the instructions also cause the processor to generate a mitigating instruction to stop or modify operation of the robot.

While the disclosure has been particularly shown and described with reference to specific aspects, it should be understood by those skilled in the art that various changes in form and detail may be made therein without departing from the spirit and scope of the disclosure as defined by the appended claims. The scope of the disclosure is thus indicated by the appended claims and all changes, which come within the meaning and range of equivalency of the claims, are therefore intended to be embraced.

The invention claimed is:

1. A device comprising:
a processor configured to:
generate a normal movement instruction for a robot, wherein the normal movement instruction instructs the robot to follow a trajectory at a movement speed, wherein the trajectory and the movement speed are associated with an expected optic flow along the trajectory;
generate a predefined motion instruction for the robot, wherein the predefined motion instruction instructs the robot to perform a random movement at a test time along the trajectory, wherein the random movement is associated with an expected observation at the test time;
determine the expected optic flow based on the normal movement instruction and a ground window defined by a width of the robot and a forward length along the trajectory of the robot;
determine a systematic failure based on:
a first difference between the expected observation and a current observation of the robot at the test time, wherein the current observation is determined from received sensor data; or
a second difference between the expected optic flow and a measured optic flow, wherein the measured optic flow is based on received optic sensor data; and
control movement of the robot based on the systematic failure.

2. The device of claim 1, further comprising a transmitter configured to transmit the predefined motion instruction to the robot and a receiver configured to receive the received sensor data indicative of the current observation of the robot at the test time.

3. The device of claim 1, wherein the systematic failure comprises at least one of a sensor failure of a sensor that provides the received sensor data, a manipulator failure in a manipulator of the robot that is configured to perform the random movement, a processing failure of the processor, a transmission failure in transmitting the predefined motion instruction to the robot.

4. The device of claim 1, wherein the random movement at the test time comprises a modification to a trajectory plan of a manipulator of the robot, wherein the trajectory plan comprises manipulator movement instructions for a work task of the robot.

5. The device of claim 4, wherein the modification to the trajectory plan comprises a modified path of the manipulator from a start position to a target position, wherein the modified path is different from a typical path of the manipulator defined by the trajectory plan.

6. The device of claim 4, wherein the modification to the trajectory plan comprises a modified joint configuration of the manipulator at a target position, wherein the modified joint configuration is different from a typical joint configuration of the manipulator at the target position defined by the trajectory plan.

7. The device of claim 1, further comprising a sensor, wherein the device is configured to receive the received sensor data from the sensor, wherein the sensor comprises at least one of a depth sensor, a camera, a radar, a light ranging and detection sensor, or an ultrasonic sensor.

8. The device of claim 2, wherein the receiver is further configured to receive second sensor data indicative of the current observation of the robot at the test time, wherein the second sensor data is associated with a second sensor and the received sensor data is associated with a first sensor, wherein the first sensor is different from the second sensor, wherein the processor is configured to determine a latency difference between the first sensor and the second sensor based on the received sensor data and the second sensor data.

9. The device of claim 1, wherein the random movement comprises a uniquely identifiable movement.

10. The device of claim 1, wherein the processor is configured to generate a second predefined motion instruction for a second robot, wherein the second predefined motion instruction instructs the second robot to perform the random movement at the test time, wherein the processor is configured to determine an execution delay based on a third difference between the current observation and a second current observation of a second robot, wherein the second current observation is based on received second sensor data indicative of the second current observation of the second robot at the test time.

11. The device of claim 1, wherein the random movement comprises a fault-specific motion pattern.

12. The device of claim 2, wherein the processor is configured to generate a second predefined motion instruction for a second robot, wherein the second predefined motion instruction comprises a second random movement for the second robot, is coordinated with the predefined motion instruction, and is associated with a second expected observation at a response time that is after the test time, wherein the receiver is further configured to receive second sensor data indicative of a second current observation of the second robot at the response time, wherein the processor is configured to determine the systematic failure further based on a second-fourth difference between the second expected observation and the second current observation.

13. A device comprising:
a processor configured to:
generate a motion instruction for a robot, wherein the motion instruction instructs the robot to follow a trajectory at a movement speed, wherein the trajectory and movement speed are associated with an expected observation along the trajectory, wherein the expected observation comprises an expected optic flow of the trajectory;
determine the expected optic flow based on the motion instruction and a ground window defined by a width of the robot and a forward length along the trajectory of the robot;
determine a systematic failure based on a difference between the expected observation and a current observation of the robot along the trajectory, wherein the current observation comprises a measured optic flow for an image sequence of the trajectory determined from received optic data; and
control movement of the robot based on the systematic failure.

14. The device of claim 13, further comprising a transmitter configured to transmit the motion instruction to the robot and a receiver configured to receive the received optic data indicative of the current observation of the robot.

15. The device of claim 13, wherein the forward length comprises a safe braking distance needed for the robot to stop moving along the trajectory.

16. A non-transitory computer readable medium, including instructions which, if executed, cause a processor to:
generate a normal movement instruction for a robot, wherein the normal movement instruction instructs the robot to follow a trajectory at a movement speed, wherein the trajectory and the movement speed are associated with an expected optic flow along the trajectory;
generate a predefined motion instruction for the robot, wherein the predefined motion instruction instructs the robot to perform a random movement at a test time along the trajectory, wherein the random movement is associated with an expected observation at the test time; and
determine the expected optic flow based on the normal movement instruction and a ground window defined by a width of the robot and a forward length along the trajectory of the robot;
determine a systematic failure based on:
a first difference between the expected observation and a current observation of the robot at the test time, wherein the current observation is determined from received sensor data; or
a second difference between the expected optic flow and a measured optic flow, wherein the measured optic flow is based on received optic sensor data; and
control movement of the robot based on the systematic failure.

17. The non-transitory computer readable medium of claim 16, wherein the instructions are further configured to:
cause a transmitter to transmit the predefined motion instruction to the robot; and
cause a receiver to receive the received sensor data indicative of the current observation of the robot at the test time.

18. The non-transitory computer readable medium of claim 16, wherein the systematic failure comprises at least one of a sensor failure of a sensor that provides the received sensor data, a manipulator failure in a manipulator of the robot that is configured to perform the random movement, a processing failure of the processor, a transmission failure in transmitting the predefined motion instruction to the robot.

19. The non-transitory computer readable medium of claim 16, wherein the random movement at the test time comprises a modification to a trajectory plan of a manipulator of the robot, wherein the trajectory plan comprises manipulator movement instructions for a work task of the robot.

20. The non-transitory computer readable medium of claim 19, wherein the modification to the trajectory plan comprises a modified path of the manipulator from a start position to a target position, wherein the modified path is different from a typical path of the manipulator defined by the trajectory plan.

21. The non-transitory computer readable medium of claim 19, wherein the modification to the trajectory plan comprises a modified joint configuration of the manipulator at a target position, wherein the modified joint configuration is different from a typical joint configuration of the manipulator at the target position defined by the trajectory plan.

22. The non-transitory computer readable medium of claim 16, wherein the instructions are further configured to cause the processor to receive the received sensor data from a sensor, wherein the sensor comprises at least one of a depth sensor, a camera, a radar, a light ranging and detection sensor, or an ultrasonic sensor.

* * * * *